United States Patent
Ravise et al.

(12) 
(10) Patent No.: US 11,348,565 B2
(45) Date of Patent: May 31, 2022

(54) ASSEMBLY FORMING AN ACOUSTIC INSULATOR

(71) Applicant: Airbus Operations SAS, Toulouse (FR)

(72) Inventors: Florian Ravise, Saint-Herblain (FR); Lionel Czapla, Cornebarrieu (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 403 days.

(21) Appl. No.: 16/664,995

(22) Filed: Oct. 28, 2019

(65) Prior Publication Data

US 2020/0143786 A1 May 7, 2020

(30) Foreign Application Priority Data

Nov. 7, 2018 (FR) ...................................... 1871386

(51) Int. Cl.
| | |
|---|---|
| *G10K 11/168* | (2006.01) |
| *G10K 11/172* | (2006.01) |
| *B32B 3/12* | (2006.01) |
| *B32B 3/26* | (2006.01) |

(52) U.S. Cl.
CPC .......... *G10K 11/168* (2013.01); *G10K 11/172* (2013.01); *B32B 3/12* (2013.01); *B32B 3/266* (2013.01); *B32B 2307/102* (2013.01); *B32B 2605/18* (2013.01)

(58) Field of Classification Search
CPC ...... G10K 11/168; G10K 11/172; B32B 3/12; B32B 3/266; B32B 2307/102; B32B 2605/18
USPC ....................................................... 181/292
See application file for complete search history.

(56) References Cited

U.S. PATENT DOCUMENTS

| | | | |
|---|---|---|---|
| 3,952,831 A | 4/1976 | Bernard et al. | |
| 8,708,747 B2 | 4/2014 | Leroyer et al. | |
| 9,704,467 B1* | 7/2017 | Nampy | .................... F02C 7/24 |
| 2010/0320201 A1 | 12/2010 | Dagesse | |
| 2015/0027629 A1* | 1/2015 | Butler | .................. G10K 11/168 |
| | | | 156/306.6 |

(Continued)

FOREIGN PATENT DOCUMENTS

| | | |
|---|---|---|
| EP | 2960023 A1 | 12/2015 |
| FR | 3026122 A1 | 3/2016 |

OTHER PUBLICATIONS

French Search Report; priority document.

*Primary Examiner* — Forrest M Phillips
(74) *Attorney, Agent, or Firm* — Greer, Burns & Crain, Ltd.

(57) ABSTRACT

An assembly forming an acoustic insulator having a first sheet, a pierced second sheet, and a plurality of first and second structures. Each first structure comprises a first and a second strip, wherein each is shaped to form half of the wall of a cage and wherein, for two successive halves, each strip comprises a facet of a joining wall. Each second structure is made up of a first and a second strip, wherein each is shaped to form half of the wall of a cone, wherein. For each strip, at least one of the wall halves of each cone is pierced. For two successive halves, each strip comprises one facet of the connecting wall. Each cone is located in a cell and each connecting wall is located between the two facets of a joining wall, and, between two adjacent first structures, a second structure is likewise fitted.

6 Claims, 3 Drawing Sheets

(56) References Cited

U.S. PATENT DOCUMENTS

| | | | |
|---|---|---|---|
| 2015/0041248 A1 | 2/2015 | Ichihashi | |
| 2015/0373470 A1* | 12/2015 | Herrera | G10K 11/172 |
| | | | 156/196 |
| 2017/0303059 A1 | 10/2017 | Herrera et al. | |
| 2018/0142622 A1* | 5/2018 | Biset | G10K 11/16 |
| 2018/0230905 A1 | 8/2018 | Riou et al. | |
| 2018/0304986 A1* | 10/2018 | Porte | B64C 1/40 |
| 2019/0063318 A1* | 2/2019 | Roach | G10K 11/172 |
| 2019/0251943 A1* | 8/2019 | Thomas | F02K 1/827 |
| 2019/0270504 A1* | 9/2019 | Cedar | G10K 11/172 |

* cited by examiner

ASSEMBLY FORMING AN ACOUSTIC INSULATOR

CROSS-REFERENCES TO RELATED APPLICATIONS

This application claims the benefit of the French patent application No. 1871386 filed on Nov. 7, 2018, the entire disclosures of which are incorporated herein by way of reference.

FIELD OF THE INVENTION

The present invention relates to an assembly forming an acoustic insulator, and to a method for manufacturing such an assembly.

BACKGROUND OF THE INVENTION

During its operation, an aircraft engine generates noise. This engine is housed in a nacelle and, in order to attenuate this noise, it is a known practice to fit assemblies forming an acoustic insulator around the engine in the structure of the nacelle.

Such assemblies forming an acoustic insulator take the form, for example, of honeycomb structures. Such a honeycomb structure comprises two parallel sheets, one of which is perforated and between which hexagonal cells that are juxtaposed with one another are arranged.

It is also known practice, in other applications, to use cone frustums which are placed in cavities.

Although, from an acoustic standpoint, such assemblies provide good results, it is desirable to find an assembly forming an acoustic insulator that makes it possible to attenuate a certain number of acoustic frequencies and is easy to manufacture.

SUMMARY OF THE INVENTION

An object of the present invention is to propose an assembly forming an acoustic insulator that can attenuate a certain number of acoustic frequencies and is easy to manufacture.

To this end, an assembly forming an acoustic insulator and having a first sheet, a second sheet pierced with holes, a plurality of first structures disposed alongside one another in a second direction, and a plurality of second structures disposed alongside one another in the second direction is proposed, wherein each first structure comprises a succession of cages, each delimiting a cell having a cross section with a given shape, and, between two adjacent cages, a joining wall made up of two faces spaced apart from one another, wherein each second structure comprises a succession of hexagonal cones, each having a base and a tip, and, between two adjacent cones, a connecting wall made up of two facets, wherein the base has a cross section with the same shape as the cross section of the cells, wherein each first structure is made up of a first strip and a second strip that are disposed facing one another and extend between the first sheet and the second sheet, wherein, for each cage, the first strip is shaped to form half of the wall of the cage and the second strip is shaped to form the other half of the wall of the cage, and wherein, for two successive halves, each strip comprises one facet of the joining wall that connects two consecutive halves, wherein each second structure is made up of a first strip and a second strip that are disposed facing one another and extend between the first sheet and the second sheet, wherein, for each cone, the first strip is shaped to form half of the wall of the cone and the second strip is shaped to form the other half of the wall of the cone, wherein, for each strip, at least one of the wall halves of each cone is pierced by a hole, and wherein, for two successive halves, each strip comprises one facet of the connecting wall that connects two consecutive halves, such that each cone is located in a cell and such that each connecting wall is located between the two facets of a joining wall, and wherein, between two adjacent first structures, a second structure is likewise fitted.

Such an assembly makes it possible to achieve attenuation of several acoustic frequencies and is easy to manufacture.

Advantageously, at least one cone is asymmetric, such that the volumes of the two chambers created between the cone and the wall of the cage in which it is housed are different.

Advantageously, at least one of the ends of the strips has pierced holes.

According to one particular embodiment, the shape is a hexagon, each half of the wall of a cage is made up of three successive facets, and each half of the wall of a cone is made up of three successive facets.

According to another particular embodiment, the shape is a circle, each half of the wall of a cage is made up of a half-cylinder, and each half of the wall of a cone is made up of a half-cone of revolution.

The invention also proposes a method for manufacturing an assembly according to one of the preceding variants, comprising:

a first step, during which a first strip of the second structure is fastened to a first strip of the first structure, a second step, during which a second strip of the second structure is fastened to the first strip of the second structure thus fastened, a third step, during which a second strip of the first structure is fastened to the second strip of the second structure thus fastened, as long as a first structure or a second structure needs to be added, a step of returning to the first step considering that the second strip of the first structure thus fastened constitutes the first strip of the following first structure, a step during which the first and second structures thus fastened are fastened between the first sheet and the second sheet.

BRIEF DESCRIPTION OF THE DRAWINGS

The features of the invention that are mentioned above, and other features, will become more clearly apparent from reading the following description of an exemplary embodiment, the description being given in relation to the appended drawings, in which.

DETAILED DESCRIPTION OF THE PREFERRED EMBODIMENTS

Figure 1:
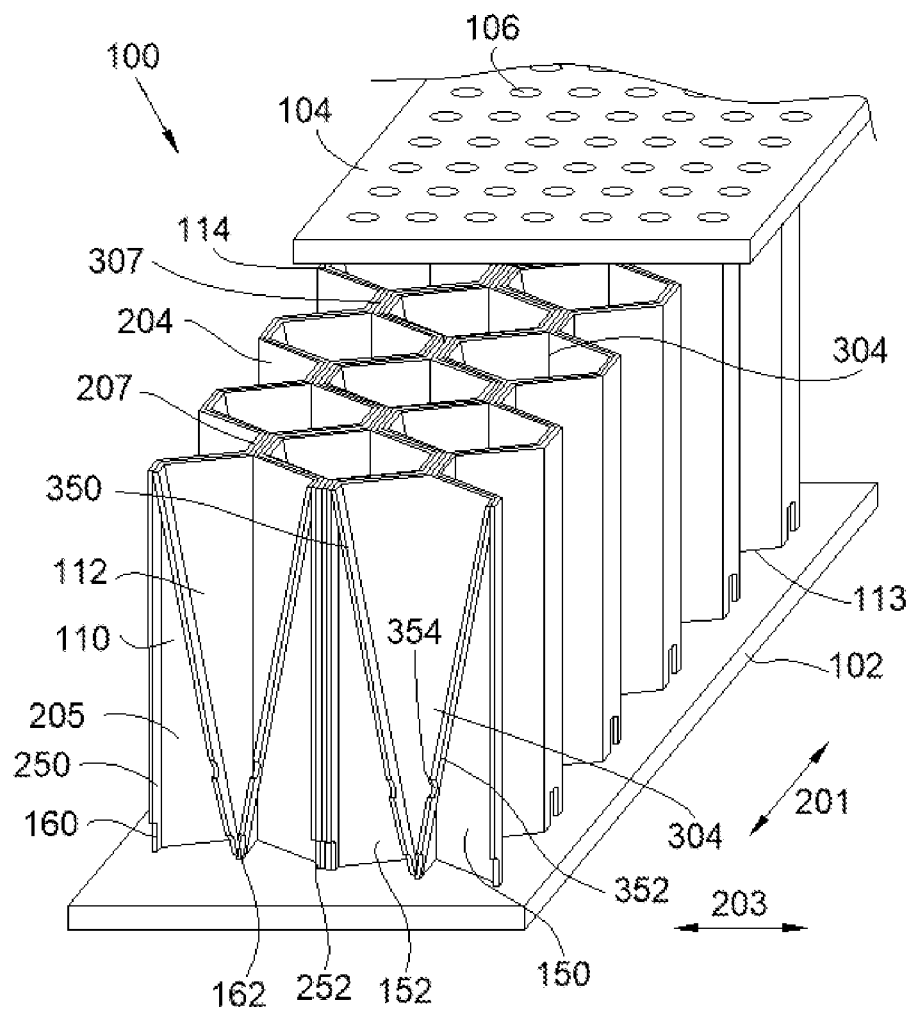
FIG. 1 is a perspective view of an assembly forming an acoustic insulator according to a first embodiment of the invention.

FIG. 1 shows an assembly 100 forming an acoustic insulator according to a first embodiment of the invention. The assembly 100 has a first sheet 102 and a second sheet 104 which are spaced apart from one another. One of the sheets, in this case the second sheet 104, is pierced with holes 106 to allow the passage of sound waves.

Disposed between the first sheet 102 and the second sheet 104 are a plurality of first structures 110 and a plurality of second structures 112.

Figure 2:
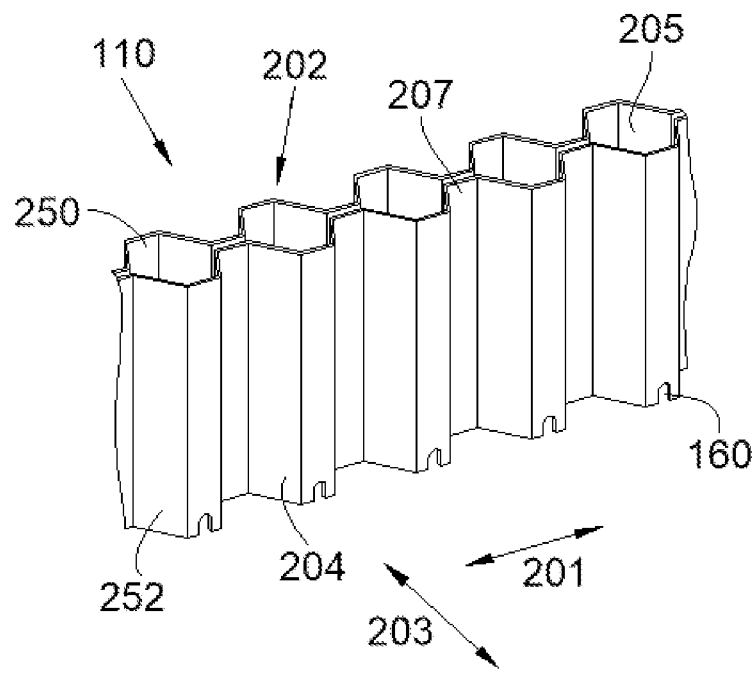
FIG. 2 is a perspective view of a first structure of the acoustic insulator in FIG. 1.
Figure 3:
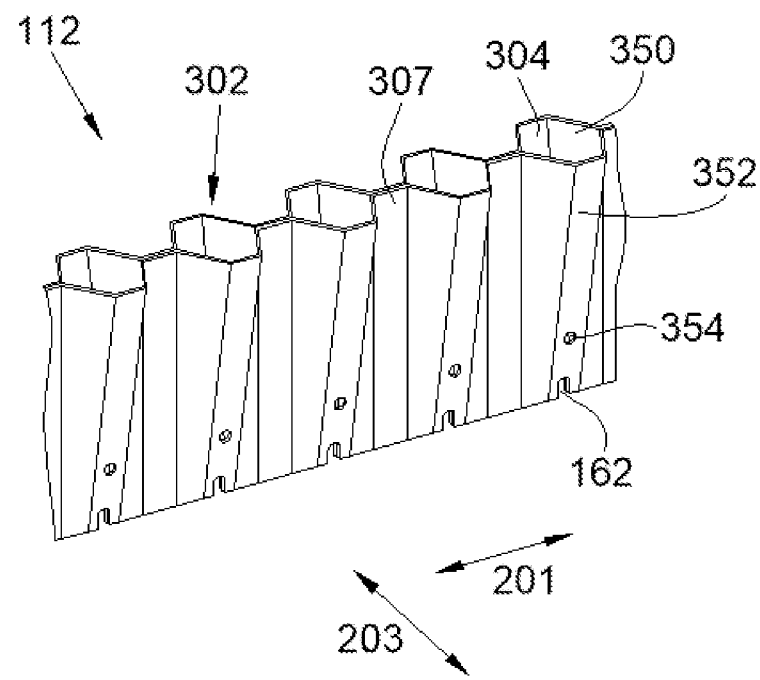
FIG. 3 is a perspective view of a second structure of the acoustic insulator in FIG. 1.

FIG. 2 shows the first structure 110 and FIG. 3 shows the second structure 112.

The first structure 110 forms a honeycomb structure which comprises a succession of cages 202 that extend in a first direction 201, forming a row, and in the assembly 100, the first structure 110 repeats in a second direction 203 perpendicular to the first direction 201, thus forming columns. Each cage 202 is hollow and has a wall with a hexagonal cross section and with six facets 204 that are parallel in pairs. Each cage 202 delimits a hexagonal cell 205.

In a row, each cage 202 is attached to each adjacent cage 202 by a joining wall 207 which is parallel to the first direction 201. Each joining wall 207 of the first structure 110 is double and is thus made up of two parallel facets. The two facets of the joining wall 207 are spaced apart from one another to allow the introduction of a connecting wall 307 of the second structure 112, as will be explained below.

In the second direction 203, the cages 202 are disposed against one another in staggered rows and two adjacent cages 202 have a common facet 204. Moreover, each joining wall 207 of one row forms one of the facets 204 of the cage 202 of the adjacent row.

The facets 204 and the joining walls 207 extend between a first end 113 secured to the first sheet 102 and a second end 114 secured to the second sheet 104. The ends 113 and 114 are fastened to the first sheet 102 and the second sheet 104, for example by adhesive bonding, welding or the like.

For one row, the first structure 110 is made up of a first strip 250 and of a second strip 252, which are disposed facing one another and extend between the first sheet 102 and the second sheet 104.

For each cage 202, the first strip 250 is shaped to form half of the wall of the cage 202 in the form of three successive facets 204 and the second strip 252 is shaped to form the other half of the wall of the cage 202 in the form of three other successive facets 204 of the cage 202.

For two successive half-hexagons, each strip 250, 252 comprises one facet of the joining wall 207 that connects two consecutive half-hexagons.

The second structure 112 comprises a succession of cones 302 that extend in the first direction 201 and in the assembly 100, the second structure 112 repeats in the second direction 203.

The base of each cone 302 has a hexagonal cross section and is positioned between the two strips 250 and 252 of the first structure 112 at the second end 114, while the tip of each cone 302 comes into contact with the first sheet 102. Each cone 302 forms a hexagonal cone with a wall with six facets 304. The hexagonal base has dimensions suited to those of the cell 205 in order to be housed therein.

In a row, each cone 302 is separated from its neighbor by a connecting wall 307 that is parallel to the first direction 201. Each connecting wall 307 is double and is thus made up of two facets that are parallel and secured together.

Each cone 302 is positioned in a cell 205 and the connecting wall 307 is positioned between the facets of the joining wall 207.

For a row, the second structure 112 is made up of a first strip 350 and of a second strip 352, which are disposed facing one another and extend between the bases and the tips of the cones 302, that is to say, between the first sheet 102 and the second sheet 104.

For each cone 302, the first strip 350 is shaped to form half of the wall of the cone 302 in the form of three successive facets 304 of the cone 302 and the second strip 352 is shaped to form the other half of the wall of the cone 302 in the form of the three other successive facets 304 of the cone 302.

For two successive half-cones, each strip 350, 352 comprises a facet of the connecting wall 307 that connects two consecutive half-cones.

For each strip 350, 352, at least one of the wall halves of each cone 302 is pierced with a hole 354 for the passage of sound waves, that is to say, in this case, at least one of the facets 304.

Thus, in a row in the first direction 201, a cone 302 of the second structure 112 is disposed in each cell 205 of the first structure 110. Since the connecting walls 307 extend from one cell 205 to another, the volume between the cone 302 and the wall of the cage 202 in which the cone 302 is housed is divided into two separate chambers 150 and 152.

Moreover, a second structure 112 is likewise fitted between two first structures 110 that are adjacent in the second direction 203. The two adjacent first structures 110 are spaced apart from one another to allow the passage of the connecting walls 307.

Such an assembly 100 thus forms an acoustic insulator that combines the quarter-wave principle and a Helmholtz resonator. The inside of each cone 302 attenuates high frequencies, and the chambers 150 and 152 attenuate low frequencies. Moreover, it is possible to produce cones 302 that are asymmetric so as to obtain chambers 150 and 152 with different volumes in order to attenuate two different low frequencies.

Moreover, such an assembly 100 is easy to produce.

Depending on the materials used, each strip 250, 252, 350, 352 can be produced by stamping, thermoforming or folding, then fastened by any appropriate means, welding, adhesive bonding, etc.

Moreover, the densities and the thicknesses of the strips 250, 252, 350, 352 may be different in order to have a balance between the mechanical integrity of the assembly 100 and the forming flexibility for the strips.

The assembly principle comprises fastening a first strip 350 of the second structure 112 to a first strip 250 of the first structure 110, then in fastening a second strip 352 of the second structure 112 to the first strip 350 of the second structure 112 thus fastened, then in fastening a second strip 252 of the first structure 110 to the second strip 352 of the second structure 112 thus fastened.

The process continues in the same way, considering that the second strip 252 of the first structure 110 thus fixed constitutes the first strip 250 of the following first structure 110.

The manufacturing and assembly method is thus simple and makes use of simple steps.

The assembly is then fastened between the first sheet 102 and the second sheet 104.

The method for manufacturing the assembly 100 thus comprises:

a first step, during which a first strip 350 of the second structure 112 is fastened to a first strip 250 of the first structure 110, a second step, during which a second strip 352 of the second structure 112 is fastened to the first strip 350 of the second structure 112 thus fastened, a third step, during which a second strip 252 of the first structure 110 is fastened to the second strip 352 of the second structure 112 thus fastened, as long as a first structure 110 or a second structure 112 needs to be added, a step of returning to the first step considering that the second strip 252 of the first structure 110 thus fastened constitutes the first strip 250 of the following first structure 110, a step during which the first and second structures 110, 112 thus fastened are fastened between the first sheet 102 and the second sheet 104.

During the fastening between the first sheet 102 and the second sheet 104, the first ends 113 and the tips of the cones 302 are fastened to the first sheet 102, and the second ends 114 and the bases of the cones 302 fastened to the second sheet 104.

In order to take into account the curvature when the assembly 100 needs to be fitted against an arcuate part, for example an air inlet, a turbomachine nozzle acoustic plug, etc., the strips 250, 252, 350 and 352 are joined together directly on tooling that reproduces the arcuate shape corresponding to the arcuate part. In other words, the strips are firstly shaped, taking into account the final curvature to be obtained, then they are formed, and they are then fastened together on the tooling.

When there is a risk of the presence of liquid in the assembly 100, the ends of the strips 250, 252, 350 and 352 that are located lowest down have pierced holes 160 and 162 for draining the liquids. In the embodiment of the invention that is shown in FIGS. 1 to 3, the pierced holes 160 and 162 are at the end corresponding to the first sheet 102, but in another embodiment in which the first sheet 102 is above the second sheet 104, the pierced holes will be provided at the end corresponding to the second sheet 104.

Besides acting as a passage for the liquids to be drained, the pierced holes 106 also make it possible to increase the volume by putting the different volumes into communication with one another.

Figure 4:
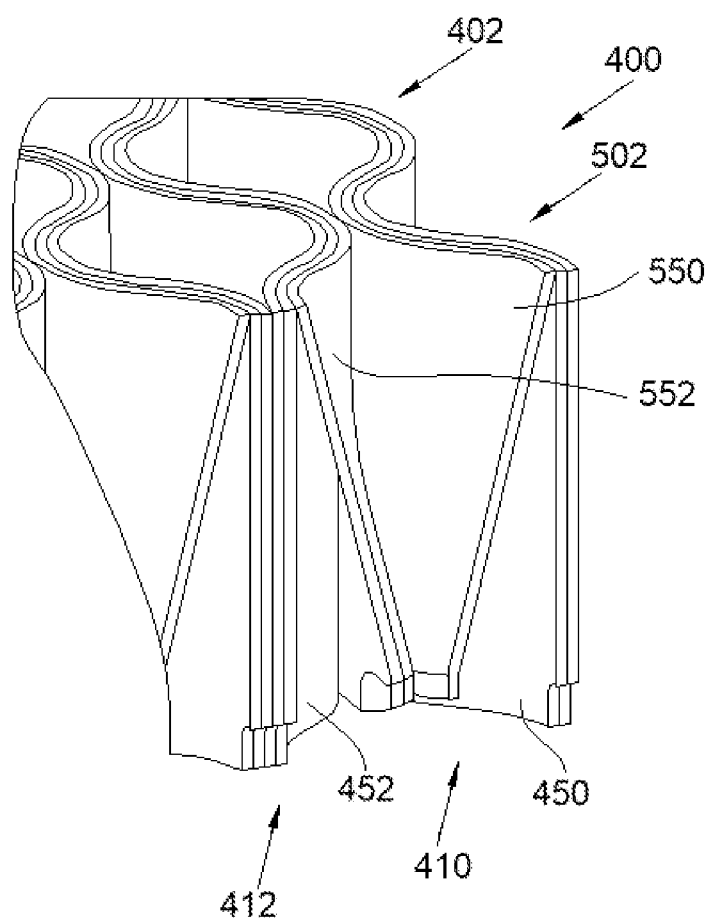
FIG. 4 is a perspective view of an assembly forming an acoustic insulator according to a second embodiment of the invention.

FIG. 4 shows an assembly 400 forming an acoustic insulator according to a second embodiment of the invention. The assembly 400 according to the second embodiment is similar to the assembly 100 according to the first embodiment except that the hexagonal shapes have been replaced by circular shapes.

Thus, the first structure 410 forms a honeycomb structure that comprises a succession of cages 402, each being hollow and having a circular cross section, thus each delimiting a cylindrical cell. For a row, the first structure 410 is made up of a first strip 450 and of a second strip 452, which are disposed facing one another and extend between the first sheet and the second sheet. For each cage 402, the first strip sheet 450 is shaped to form half of the wall of the cage 402, which, in this case, is in the form of a half-cylinder and the second strip 452 is shaped to form the other half of the wall of the cage 402, which, in this case, is in the form of a half-cylinder.

The joining walls are likewise made up of two facets that are spaced apart from one another. In the second embodiment, the joining walls are in the form of a cylindrical arc.

The second structure 412 comprises a succession of cones 502, wherein the base of each cone 502 has a circular cross section and is positioned between the two strips 450 and 452 of the first structure 410. Each cone 502 forms a cone of revolution. The circular base has the same dimensions as the cell in order to be able to be housed therein.

For a row, the second structure 412 is made up of a first strip 550 and of a second strip 552, which are disposed facing one another and extend between the bases and the tips of the cones 502, that is to say, between the first sheet and the second sheet. For each cone 502, the first sheet 550 is shaped to form half of the wall of the cone 502, which, in this case, is in the form of a half-cone of revolution, and the second sheet 552 is shaped to form the other half of the wall of the cone 502, which, in this case, is in the form of a half-cone of revolution.

In the second embodiment, the connecting walls are in the form of a cylindrical arc.

Of course, it is likewise possible to provide for the circular or hexagonal cross sections to be replaced by rectangular cross sections.

The possibilities of asymmetry of the cones and of the presence of the pierced holes are applicable to all the embodiments.

Thus, in a general manner, each first structure 110, 410 comprises a succession of cages 202, 402, each delimiting a cell 205 having a cross section with a given shape (hexagonal, circular, rectangular), and, between two adjacent cages 202, 402, a joining wall 207 made up of two facets that are spaced apart from one another.

In a general manner, each second structure 112, 412 comprises a succession of cones 302, 502, each having a base and a tip, and, between two adjacent cones 302, 502, a connecting wall 307 made up of two facets, wherein the base has a cross section with the same shape as the cross section of the cells 205.

In a general manner, each first structure 110, 410 is made up of a first strip 250, 450 and a second strip 252, 452 that are disposed facing one another and extend between the first sheet 102 and the second sheet 104, wherein, for each cage 202, 402, the first strip 250, 450 is shaped to form half of the wall of the cage 202, 402 and the second strip 252, 452 is shaped to form the other half of the wall of the cage 202, 402, and wherein, for two successive halves, each strip 250, 252, 450, 452 comprises one facet of the joining wall 207 that connects two consecutive halves. As the case may be, the half of the wall of a cage 202, 402 is made up of three successive facets 204, or of a half-cylinder.

In a general manner, each second structure 112, 412 is made up of a first strip 350, 550 and a second strip 352, 552 that are disposed facing one another and extend between the first sheet 102 and the second sheet 104, wherein, for each cone 302, 502, the first strip 350, 550 is shaped to form half of the wall of the cone 302, 502 and the second strip 352, 552 is shaped to form the other half of the wall of the cone 302, 502, wherein, for each strip 350, 352, 450, 452, at least one of the wall halves of each cone 302, 502 is pierced by a hole 354, and wherein, for two successive halves, each strip 350, 352, 450, 452 comprises one facet of the connecting wall 307 that connects two consecutive halves. As the case may be, the half of the wall of a cone 302, 502 is made up of three successive facets 304, or of a half-cone of revolution.

In a general manner, each cone 302, 502 is located in a cell 205 and each connecting wall 307 is located between the two facets of a joining wall 207, and, between two adjacent first structures 110, 410, a second structure 112, 412 is likewise fitted.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly forming an acoustic insulator and having a first sheet, a second sheet pierced with holes, a plurality of first structures disposed alongside one another in a second direction, and a plurality of second structures disposed alongside one another in the second direction,
    wherein each first structure comprises a succession of cages, each delimiting a cell having a cross section with a given shape, and, between two adjacent cages, a joining wall made up of two facets spaced apart from one another,
    wherein each second structure comprises a succession of cones, each having a base and a tip, and, between two adjacent cones, a connecting wall made up of two facets, wherein the base has a cross section with the same shape as the cross section of the cells,
    wherein each first structure is made up of a first strip and a second strip that are disposed facing one another and extend between the first sheet and the second sheet,
    wherein, for each cage, the first strip is shaped to form half of a wall of said cage and the second strip is shaped to form another half of the wall of said cage, and
    wherein, for two successive halves, each first structure strip comprises one of the two facets of the joining wall that connects two consecutive halves,
    wherein each second structure is made up of a first strip and a second strip that are disposed facing one another and extend between the first sheet and the second sheet,
    wherein, for each cone, the first strip is shaped to form half of a wall of said cone and the second strip is shaped to form another half of the wall of said cone,
    wherein, for each second structure strip, at least one of the wall halves of each cone is pierced by a hole, and
    wherein, for two successive halves, each second structure strip comprises one of the two facets of the connecting wall that connects two consecutive halves,
    such that each cone is located in a cell and such that each connecting wall is located between the two facets of a joining wall, and
    wherein, between two adjacent first structures, a second structure is likewise fitted.

2. The assembly according to claim 1, wherein at least one cone is asymmetric, such that volumes of two chambers created between said cone and the wall of the cage in which said cone is housed are different.

3. The assembly according to claim 1, wherein at least one end of each of the first structure strips and second structure strips has pierced holes.

4. The assembly according to claim 1, wherein the shape is a hexagon, in that each wall half of a cage is made up of three successive facets, and wherein each half of the wall of a cone is made up of three successive facets.

5. The assembly according to claim 1, wherein the shape is a circle, wherein each half of the wall of a cage is made up of a half-cylinder, and wherein each half of the wall of a cone is made up of a half-cone of revolution.

6. A method for manufacturing an assembly according to claim 1, comprising:
    fastening a first strip of the second structure to a first strip of the first structure, fastening a second strip of the second structure to the first strip of the second structure,
    fastening a second strip of the first structure to the second strip of the second structure,
    as long as a first structure or a second structure needs to be added to the assembly, returning to the first fastening step considering that the second strip of the first structure thus fastened constitutes the first strip of a following first structure,
    fastening the first and second structures thus fastened between the first sheet and the second sheet.

* * * * *